United States Patent [19]

Schröder et al.

[11] Patent Number: 5,321,729
[45] Date of Patent: Jun. 14, 1994

[54] METHOD FOR TRANSMITTING A SIGNAL

[75] Inventors: Ernst Schröder, Hanover; Jens Spille, Hemmingen, both of Fed. Rep. of Germany

[73] Assignee: Deutsche Thomson-Brandt GmbH, Villingen-Schwenningen, Fed. Rep. of Germany

[21] Appl. No.: 94,355

[22] Filed: Apr. 26, 1993

Related U.S. Application Data

[63] Continuation of Ser. No. 718,402, Jun. 24, 1991, abandoned.

[30] Foreign Application Priority Data

Jun. 29, 1990 [DE] Fed. Rep. of Germany ....... 4020656

[51] Int. Cl.$^5$ ............................................. H04B 1/66
[52] U.S. Cl. .................... 375/122; 375/45; 375/62; 381/36; 395/2
[58] Field of Search ............... 375/122, 45, 62; 381/31, 35, 37, 47, 29; 395/2; 358/133; 364/715.4, 424.01

[56] References Cited

U.S. PATENT DOCUMENTS

| | | | |
|---|---|---|---|
| 4,048,443 | 9/1977 | Crochrere et al. | 381/31 |
| 4,691,329 | 9/1987 | Jun et al. | 375/122 |
| 4,815,135 | 3/1989 | Taguchi | 381/37 |
| 4,821,119 | 4/1989 | Charavi | 375/122 |
| 4,845,859 | 7/1989 | Labit | 375/122 |
| 4,942,607 | 7/1990 | Schröder et al. | 381/31 |
| 5,027,376 | 6/1991 | Friedman et al. | 375/122 |
| 5,040,217 | 8/1991 | Brandenburp et al. | 381/47 |
| 5,042,069 | 8/1991 | Chhatwal et al. | 381/31 |
| 5,086,439 | 2/1992 | Asai et al. | 375/122 |
| 5,109,417 | 4/1992 | Fielder et al. | 364/715.04 |
| 5,179,623 | 1/1993 | Dickopp et al. | 395/2 |
| 5,214,742 | 5/1993 | Edler | 364/724.01 |

OTHER PUBLICATIONS

"Coding of Analog Signals with Overlapping Transform and Adaptive Window Functions" Von Berned Edler pp. 1–8 Jul. 1989.

Primary Examiner—Stephen Chin
Assistant Examiner—T. Ghebrehnsae
Attorney, Agent, or Firm—Joseph S. Tripoli; Eric P. Herrmann; Ronald H. Kurdyla

[57] ABSTRACT

In a method of transmitting a signal wherein the signal is partitioned into windows comprised of overlapping blocks with each block containing a partial signal. The partial signal in each block is converted into a digital signal and individually coded with a selected window function f(n). The overlapping areas of the window functions are weighted such that the resultant of the overlapping functions in each block equals one. The coded signals are transmitted. The received signals are reconverted into partial analog signals. The window functions are selected in accordance with frequency changes in the original signal.

4 Claims, 3 Drawing Sheets

METHOD FOR TRANSMITTING A SIGNAL

This is a continuation of application Ser. No. 07/718,402, filed Jun. 24, 1991, now abandoned.

This invention is directed to a method for transmitting a signal, such as an audio signal.

BACKGROUND OF THE INVENTION

It is known that the transmission of an audio signal, for example, radio broadcast, cable transmission, satellite transmission or recorded signals can be accomplished by converting the analog audio signal into a digital audio signal having a particular resolution. The digital signal is transmitted and upon reception is reconverted to an analog signal. One advantage of this technique is an increase in the signal-to-noise ratio, particularly during playback.

The bandwidth needed for the transmission of a digital signal is essentially determined by the number of scanning values per time unit which have to be transmitted, as well as by the resolution desired. Typically the transmission band width is kept as narrow as possible to enable the use of a narrow band channel, or to enable the transmission of a number of audio signals over an existing channel. The bandwidth needed can be minimized by reducing the scanning values or by reducing the number of bits per scanning value.

Typically, either of these reductions results in a reduction in the quality of the reproduction. In a known method of improving the playback quality, (described in German Patent DE OS 35 06 912.0) the digital audio signal is segmented into successive temporal segments and transformed into a short time spectrum which represents, for the respective time segments (for example, 20 ms) the spectral components of the signal. Because of psychoacoustic laws signal components which are not perceived by the listener, and which, therefore, are not needed to convey information, can usually be more easily found in the short time spectrum than in the time range. Such unneeded signal components are either less heavily weighted or completely left out of the transmission. The use of these measures permits a considerable portion of the unneeded data to be omitted from transmission and the average bit rate can be significantly reduced.

The method described by J. P. Princen and A. B. Bradley in "Analysis/Synthesis Filter-bank Design Based on Time Domain Aliasing Cancellation", IEEE Transactions Acoustics, Speech, Signal Processing, volume ASSP-34, pages 1153 through 1161, October 1986, is suitable for the partitioning of the signal into segments. This article describes a conversion technique in which overlapping blocks with rounded-off window functions are generated in the windows without additional coefficients in the frequency range. In this method N values are sampled from the input signal by means of a window function $f(n)$ of length N, and subsequently converted into N/2 significant coefficients in the frequency range. The reconversion calculates N scanning values, which are again weighted using the window function $f(n)$, from the N/2 coefficients.

However, the output signal of the reconversion differs from the input signal originally converted. The precise reconstruction of the input signal is only made possible when the output values of successive reconversions are added in the overlap area of N/2 scanning values. In order that the input signal can be recovered by means of this so-called "overlap-add" technique, the window function $f(n)$ must comply with the following conditions:

$$f(N-1-n) = f(n) \quad 0 <= n <= N-1 \quad (1)$$

$$f^2(N/2-1-n) + f^2(n) = 2 \quad 0 <= n <= N/2-1 \quad (2).$$

The first condition (1) corresponds to a symmetry of $f(n)$. The second condition (2) corresponds to the point symmetry of the square of $f(n)$ in one half of a window. Taking these conditions into consideration, the effective window length of the conversion can be varied between N/2 and N scanning values.

The choice of window length when using the partitioning method of conversion coding is an important consideration. A long window length with a shape which is as rounded-off as possible results in good frequency selectivity. However, the error will extend over the entire effective window length due to quantization of the coefficients after the reconversion. This can have a negative effect on the subjective quality of the coded signal, especially with large changes in the amplitude of the signal which is to be coded.

The choice of a shorter window causes a deterioration in the frequency selectivity, this has a negative effect on the conversion gain, particularly with strongly correlated input signals. In comparison, errors can be limited to the window concerned by quantizing the coefficients in case of large signal changes so that their effects on neighboring windows are avoided.

SUMMARY OF THE INVENTION

The invention is directed to an improved method for transmitting a signal using the partitioning technique described above but which results in optimum frequency selectivity and high subjective quality for the coded and decoded signal.

The invention recognizes that a partitioning method utilizing windows can be used to transmit a constant amplitude signal which undergoes a frequency change. With the invention, the frequency range of the signal (for example, 0 . . . 20 Khz) is partitioned into at least two separate frequency ranges according to psychoacoustic considerations. The input signal is separately evaluated in the respective frequency ranges and the individual results are recombined to produce the audio signal.

Also with the invention, the change in frequency is used for the filter band change-over of a sub-band coder (adaptive windowing), and the conversion gain is increased. Also, by using the frequency change, adaptive quantization and coding can also be controlled for audio coding methods such as, for example, NICAM, MUSICAM, and MSC, which permit a variable block length. Furthermore, the use of frequency change allows the time and frequency of occurrence of various factors, such as scale factors, or bit allocation factors, for example, to be calculated so that an improved controllability and observability is possible with the conversion and the above-described audio coding method.

It is particularly advantageous to utilize both amplitude changes and the frequency changes to determine the adaptive windowing, quantization and coding of the signal to be transmitted.

In the drawings:

BRIEF DESCRIPTION OF THE DRAWINGS

FIG. 3b shows a window function which is matched to the audio signal shown in FIG. 3a.

DETAILED DESCRIPTION

Figure 1A:
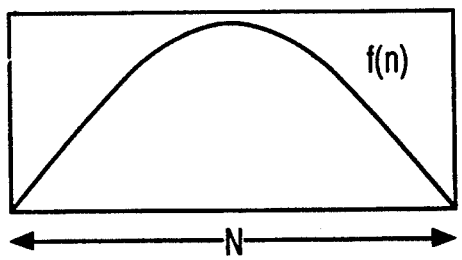
FIGS. 1a through 1c show various window functions f(n) having different widths.
Figure 1B:
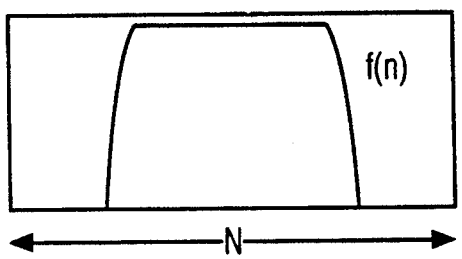
Figure 1C:
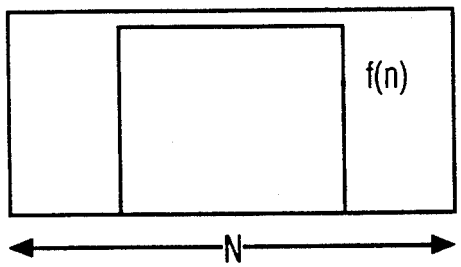

Several windows having the same width N and different window functions f(n) are shown in FIGS. 1a to 1c. The windows are combined such that the adjacent windows overlap by one half. Accordingly, the sine wave window function f(n) in FIG. 1a overlaps by one-half when two such window functions are combined. Window functions of the type shown in FIG. 1b overlap less than one half. Functions f(n) of the type shown in FIG. 1c have the two sides touching when two of such window functions f(n) are combined.

Figure 2:
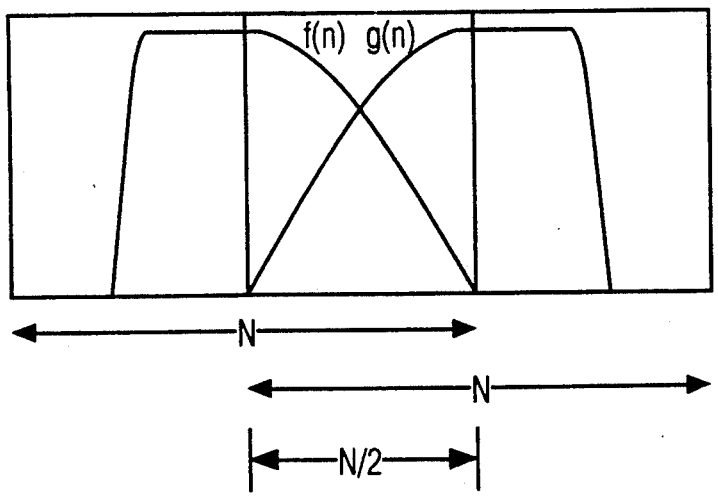
FIG. 2 shows combined asymmetric window functions.

FIG. 2 shows the overlaying of two windows having asymmetric window functions f(n) and g(n). However, the window functions are designed in the overlap areas in such a manner that their resultant equals one.

Figure 3A:
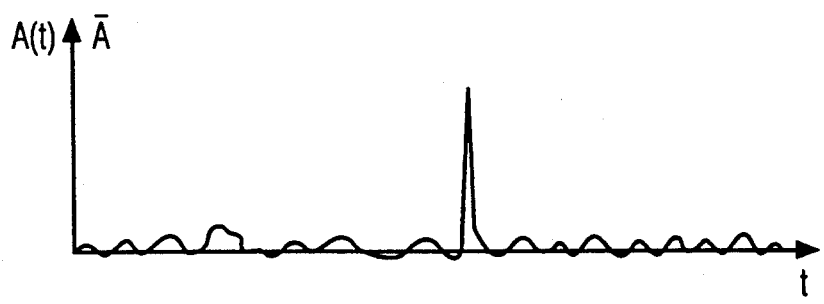
FIG. 3a shows an audio signal having an amplitude change.
Figure 3B:
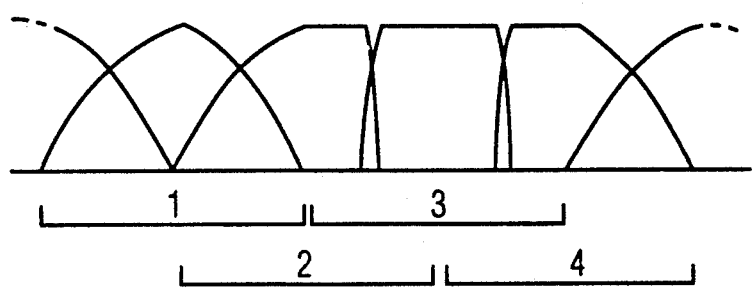

An amplitude characteristic A(t) of an input signal is shown in FIG. 3a. As can be seen, initally the signal has a constant low amplitude which is followed by a signal change after which the original amplitude continues. The functions of the windows which enable optimum processing of this signal are shown in FIG. 3b. Sine wave window functions are used in the first area 1, to maximize the frequency selectivity. Area 3, which is the area in which the high amplitude change occurs, utilizes a window function which is very narrow, for example, the type shown in FIG. 1b. The window functions of areas 2 and 4, have appropriately adapted window functions such that they overlap and their resultant in the overlap is equal to one. Accordingly, the window functions for areas 2 and 4 are asymmetrical. Quantization disturbances which occur in area 3, the area in which the amplitude change occurs, are thus restricted to that area. The disturbances are therefore reduced to about one half of the temporal extent when compared to a window function having a sine wave configuration. Despite the reduced frequency selectivity, a substantial improvement in audio quality is realized because of the masking of the signal change.

Figure 3C:
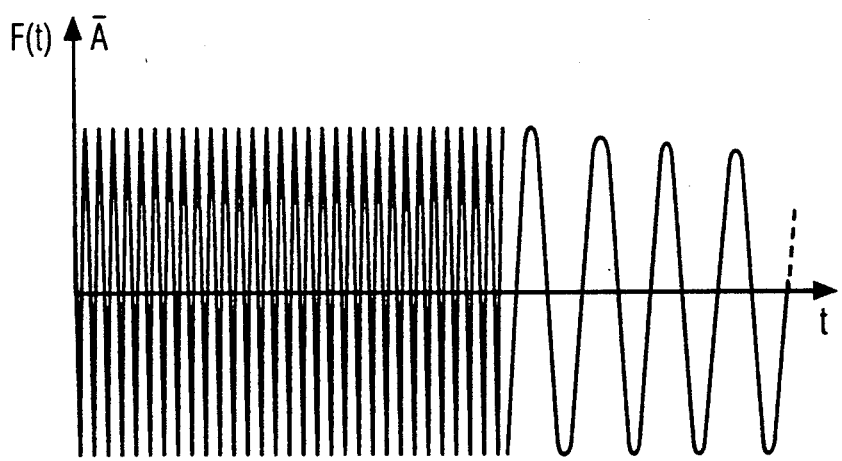
FIG. 3c shows a constant amplitude signal having a frequency change.
Figure 3D:
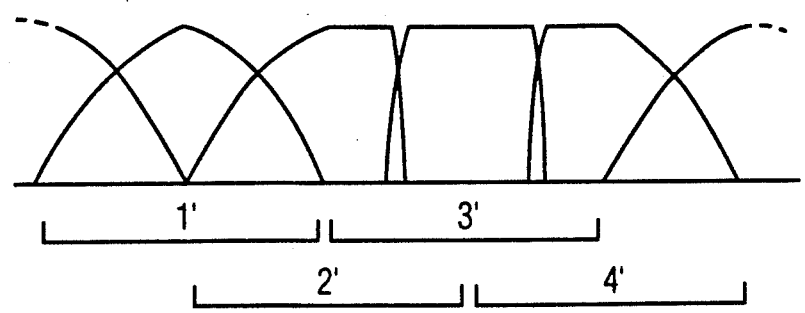
FIG. 3d shows a window function which is matched to the signal shown in FIG. 3c.

FIG. 3c shows a constant amplitude signal having a frequency F(t). Initially the signal has a constant frequency (for example, 10 kHz) and then the frequency changes to a significantly lower frequency (for example, 200 Hz). Window functions, with which this signal can be optimally processed, are shown in FIG. 3d.

In area 1' a sine wave function is used because of the high frequency selectivity of such functions. The functions of areas 2' and 3', in which the frequency change occurs, have appropriately configured functions which overlap and the resultant in the overlap is 1. Accordingly, the overlap area is very narrow. The functions in the areas 2' and 3' have an asymmetric configuration. Quantization disturbances which might occur within area 3', in which the frequency change occurs, are restricted to the area 3', and are thus reduced to about one half of the temporal extent when compared to a window function with sine wave configuration. Thus, despite the reduced frequency selectivity, a subjective improvement in audio quality results because of the masking effect of the signal change. The length of the window is determined by the extent of the frequency change. Thus, for large frequency changes the window length is short, while for small frequency changes the window length is long. Also, the spacing between windows is constant and therefore is also determined by the frequency change.

For the most simple frequency change, the signal with the desired frequency range (0 . . . 20 Khz) is partitioned into two separate frequency ranges (0 to 1 KHz and 1 kHz to 20 kHz, for example). Each frequency range is separately processed and after reception, the separate results are combined to yield the audio signal.

Because of psychoacoustical considerations upon decay of the signal energy in the upper frequency range, and because of the simultaneous increase in the lower frequency range, a change in the window function f(n) must be made. A function change is thus needed in the area 3 where the frequency change shown in FIG. 3c occurs. A change in the window function f(n) is not necessary when the energy level in the upper frequency range decreases but no increase in the energy of the lower frequency range occurs because such changes are not critical. Also, a window function change is not needed when an energy increase occurs only in the lower frequency range. However, when an energy increase occurs in only the upper frequency range then a window function change is required. When an energy increase occurs in both the upper and lower frequency ranges a change to small window lengths is required because the signal must contain pulses.

Analysing filters, of the type presently used in subband coders, are suitable for the detection of the frequency changes. However, simpler filter types (for example, minimum phase filters or filter banks without reconstruction possibilities) can also be used.

Figure 4A:
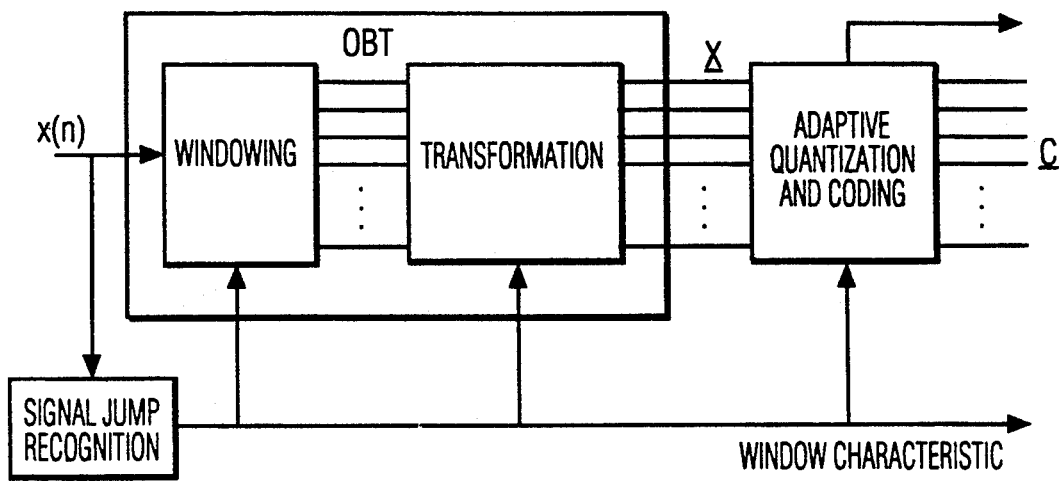
FIG. 4a is a block circuit diagram of a preferred embodiment of a coder section for a transmitter.

FIG. 4a is a block circuit diagram of a coder section for a transmitter. The coder uses the OBT (overlapping block transform) type of conversion (transformation) which belongs to the class of half overlapping conversions described hereinabove. Upon a forward movement of one block of N scanning values in the time range and a conversion of two N scanning values, N scanning values are obtained in the picture area and additional coefficients need not be transmitted. Moreover, the OBT technique fulfills the requirement that the conversion coefficients should correspond to the spectrum of the input signal. By using non-square-shaped window functions, which is possible with the OBT, block effects are also diminished and the frequency selectivity improved. By using adaptive windowing, that is changing the conversion length and the window function configuration or the window length, the upper limit for N is not determined by the masking time. Adaptive windowing produces an additional improvement in that good frequency resolution and increased conversion gain are achieved by changing the conversion length. Also, with appropriate window adaption, pre-echos caused by changing over to shorter conversion lengths can be suppressed. Signal change recognition (a combination of amplitude change and frequency change recognition) is provided for with the window adaption technique in order to detect changes of impulse, amplitude, phase and frequency one block in advance. The recognition of the signal change results in the generation of a window characteristic which controls the windowing, conversion, adaptive quantization and coding in the coder section of the transmitter. Preanalysis of the input signal avoids the possibility of a data block being converted and coded several times with differing conversion lengths. After the preanalysis a decision is made as to which of the coded values are to be transmitted.

The coder of FIG. 4a utilizes both adaptive bit allocation and adaptive quantization, and also takes advantage of the masking characteristics of human hearing which is deaf to frequencies outside of a given frequency range. The coder thus permits taking psychoacoustic factors into consideration.

Figure 4B:
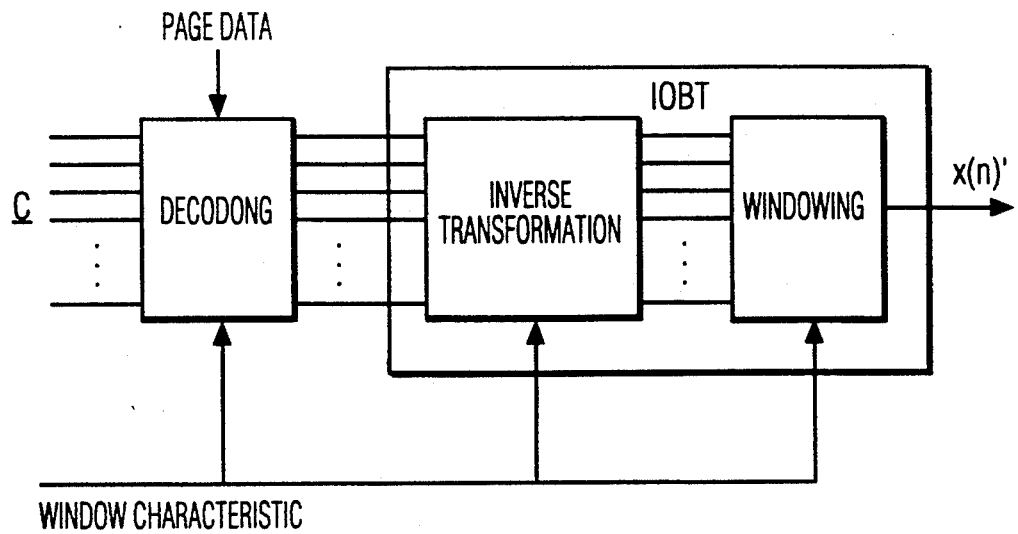
FIG. 4b is a block circuit diagram of a preferred embodiment of a decoder section for a receiver.

FIG. 4b shows a decoder which utilizes window recognition and adaptive decoding which is the inverse of BOT used in the coder of FIG. 4a and only signals with psychoacoustic relevance need to be transmitted to the decoder.

The output signal X(n)' of the decoder contains less information than the input signal X(n) to the coder of FIG. 4a. However, the missing information is outside of the frequency range of human hearing and the quality of the signal is not perceived as being degraded.

The invention described in the foregoing is not restricted to the OBT, and can be used with various audio coding methods which permit variable block lengths like, for example, NICAM, MUSICAM, MSC. The use of frequency change detection allows the time and frequency of occurrence of scale factors and allocation factors, for example, to be calculated.

What is claimed is:

1. In apparatus of the type for encoding a signal by means of spectral analysis of overlapping time segments of such signal, and including apparatus for processing respective said time segments according to a window function for imparting a characteristic amplitude function to said respective time segments prior to such analysis of said signal, an improvement comprising:

means for detecting occurrences of instantaneous frequency changes in said signal exceeding a predetermined frequency change, and generating control signals indicating occurrences of said frequency changes; and means, responsive to said control signals, for adaptively providing said window functions such that respective time segments of signal which exhibit said instantaneous frequency changes are subjected to a significantly narrowed window function relative to window functions applied to time segments of signal which do not exhibit said instantaneous frequency changes, and wherein window functions of overlapping time segments overlap.

2. The apparatus set forth in claim 1 wherein said means for providing window functions provides adjacent said window function which are overlapping, with overlapped areas of adjacent window functions being complementary versions of each other.

3. The apparatus set forth in claim 1 further including means for detecting occurrences of amplitude changes in said signal exceeding a predetermined amplitude change, and generating said control signals indicating occurrences of said frequency changes and said amplitude changes.

4. The apparatus set forth in claim 1 further including:

means for spectrally analyzing said time segments after application of said window functions to generate compressed signal components; and means for combining said compressed signal components and signal representing said control signals for transmission.

* * * * *